United States Patent

Perregaux et al.

[11] Patent Number: 5,119,181
[45] Date of Patent: Jun. 2, 1992

[54] COLOR ARRAY FOR USE IN FABRICATING FULL WIDTH ARRAYS

[75] Inventors: Alain E. Perregaux, Pittsford; Jagdish C. Tandon, Fairport; Josef E. Jedlicka; Stephen C. Corona, both of Rochester, all of N.Y.

[73] Assignee: Xerox Corporation, Stamford, Conn.

[21] Appl. No.: 681,809

[22] Filed: Apr. 8, 1991

Related U.S. Application Data

[63] Continuation-in-part of Ser. No. 501,584, Mar. 30, 1990, Pat. No. 5,031,032.

[51] Int. Cl.⁵ ............................................. H04N 9/07
[52] U.S. Cl. ............................................. 358/44; 358/75
[58] Field of Search ............... 358/41, 44, 212, 213.11, 358/52, 69, 75, 494

[56] References Cited

U.S. PATENT DOCUMENTS

| | | | |
|---|---|---|---|
| 4,604,161 | 8/1986 | Araghi | 156/645 |
| 4,614,966 | 9/1986 | Yunoki et al. | |
| 4,668,333 | 5/1987 | Tandon et al. | 156/633 |
| 4,695,716 | 9/1987 | Tandon et al. | 250/211 R |
| 4,698,131 | 10/1987 | Araghi et al. | 156/647 |
| 4,710,803 | 12/1987 | Suzuki et al. | 358/41 |
| 4,761,683 | 8/1988 | Matteson et al. | 358/75 |
| 4,814,296 | 3/1989 | Jedlicka et al. | 437/226 |
| 4,830,985 | 5/1989 | Araghi et al. | 437/209 |
| 4,870,483 | 9/1989 | Nishigaki et al. | 358/44 |
| 4,994,907 | 2/1991 | Allen | 358/75 |
| 5,027,195 | 6/1991 | Cooley et al. | 358/75 |
| 5,031,032 | 7/1991 | Perregaux et al. | 358/44 |

FOREIGN PATENT DOCUMENTS

| | | |
|---|---|---|
| 56-89176 | 7/1981 | Japan . |
| 58-20091 | 2/1983 | Japan ......................... 358/44 |
| 62-104292 | 10/1985 | Japan . |
| 61-252786 | 11/1986 | Japan . |

*Primary Examiner*—James J. Groody
*Assistant Examiner*—Kim Yen Vu
*Attorney, Agent, or Firm*—Frederick E. McMullen

[57] ABSTRACT

A color chip construction especially adapted for use in fabricating full width arrays in which the individual chip photosites consisting of a blue, green, and red photodiode shaped and positioned to provide a rectangular photosite with square sides that enhance butting of the color chip with other like color chips to form full width color arrays.

11 Claims, 5 Drawing Sheets

COLOR ARRAY FOR USE IN FABRICATING FULL WIDTH ARRAYS

This application is a continuation-in-part of application Ser. No. 07/501,584, filed Mar. 30, 1990, now U.S. Pat. No. 5,031,032, in the names of Perregaux et al.

The invention relates to color image sensor chips or arrays, and more particularly to an improved chip for use in fabricating full width color image sensor arrays.

Image sensor arrays for scanning document images, such as Charge Coupled Devices (CCDs), typically have a row or linear array of photosites together with suitable supporting circuitry integrated onto silicon. Usually, an array of this type is used to scan line by line across the width of a document in a direction referred to as the fast scan direction, with the document being moved or stepped lengthwise in a direction perpendicular to the fast scan direction (referred to as the slow scan direction) in synchronism therewith.

In the above application, the resolution depends on the scan width and the number of photosites. Because of the difficulty in economically designing and fabricating long arrays, image resolution for the typical array commercially available today is relatively low when the array is used to scan a full line. While resolution may be improved electronically as by interpolating extra image signals, the performance is not as good as with higher resolution sensors. Alternately, resolution may be improved by interlacing several smaller arrays with one another in a non-colinear fashion so as to cross over from one array to the next as scanning along the line progresses, electronic manipulations of this type adds to both the complexity and the cost of the system. Further, single or multiple array combinations such as described above usually require more complex and expensive optical systems.

A full width array having a length equal to or larger than the document line and with a large packing of co-linear photosites to assure high resolution, is very desirable. However, great care is required if the smaller chips that make up the longer array are to be assembled together such that the chip ends are in the close abutting relation with one another that is necessary to avoid loss or distortion of image data at the chip junctions.

The foregoing is more difficult when full width color scanning arrays are to be fabricated. In that case, for optimum color sensitivity, the individual photosites that make up the chips are normally subdivided into three photodiodes; this in order to detect the three different wavelength ranges representative of three colors. To enhance color response, the location and shape of the three photodiodes may result in photosites that are not suitable or readily adapted for joinder with other photosites as is required when fabricating a full width array.

In the prior art, U.S. Pat. No. 4,870,483 to Nishigaki et al discloses a color image sensor with plural sensor parts arranged in a line in which the individual photocells consist of three color sensor parts positioned so that a relatively large light shielding width is created along one side to facilitate joinder. U.S. Pat. No. 4,710,803 to Suzuki et al discloses a color image sensor having a matrix of photoelectric conversion cells on which a color filter with a color area shaped in the form of an "L" is formed. U.S. Pat. No. 4,761,683 to Matteson et al discloses a sensor having three rows of n sensors with different wavelengths for detecting blue, green, and red primary color images, together with electronic circuitry for switching the color image data out. U.S. Pat. Nos. 4,604,161 to Araghi and, 4,814,296 to Jedlicka et al disclose processes for fabricating full width arrays from plural smaller chips in which the individual chips are cleaved or cut to provide buttable ends. And, U.S. Pat. Nos. 4,668,333 to Tandon et al, 4,695,716 to Tandon et al, 4,698,131 to Araghi et al, and 4,830,985 to Araghi et al, disclose various chip forms for use in fabricating full width arrays.

In contrast, the present invention provides a color linear array espcecially adapted for butting with like arrays to form a full width color array, comprising in combination: a generally rectangular chip; an array of discrete photosites on the chip extending from one end of the chip to the other, each of the photosites consisting of at least one photodiode for each color, the shape and physical size of individual ones of the photodiodes that comprise the photosites being optimized to provide uniform detection of different colored images while cooperating to provide a generally rectangular photosite window with square sides to enhance butting of the arrays together when forming the full width array without image loss or distortion at the point where the arrays abut, the photodiodes substantially filling the photosite window.

Figure 9:
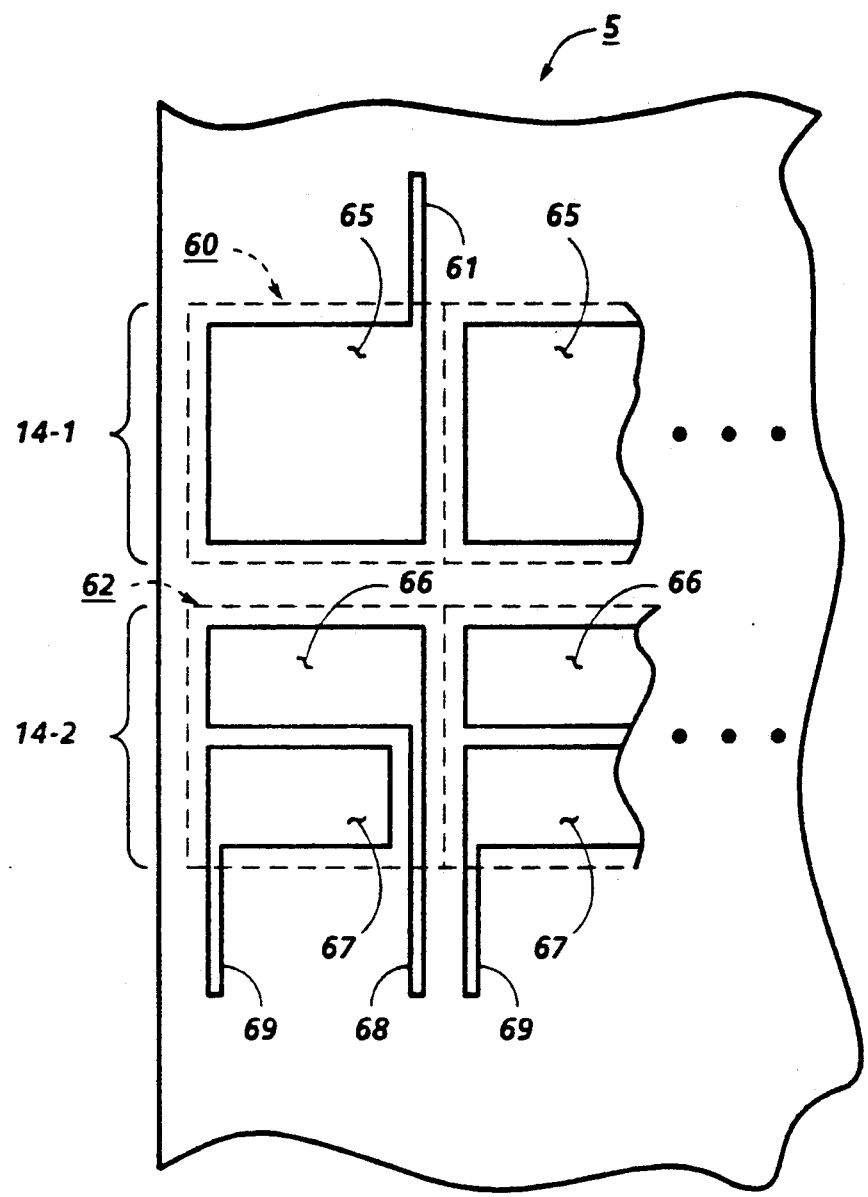
Figure 10:
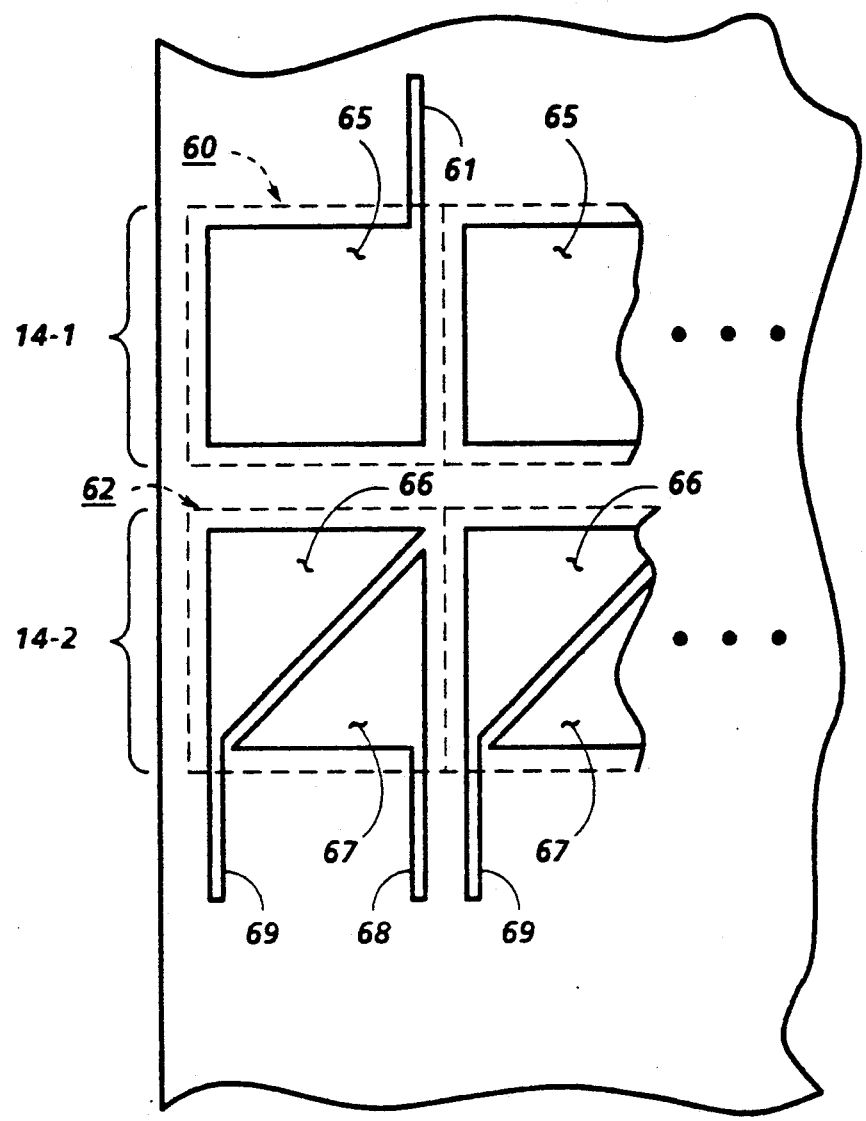

FIG. 9 depicts a sixth photodiode geometry in which two rows of color photodiodes are provided, with the photodiodes of one row consisting of a single rectangular photodiode for scanning one color while the photodiodes of the second row comprise two rectangular photodiodes for scanning two other colors, the photodiodes of the second row being approximately one-half the size of the first color photodiode for example; and FIG. 10 depicts a seventh photodiode geometry in which the photodiodes comprising the second row in the FIG. 9 embodiment have complementary triangular shapes.

Where a single sensor chip or array is used for scanning purposes, the image resolution achieved is a function of the number of photosites that can be fabricated on the chip divided by the width of the scan line. Since the number of photosites that can be packed onto a single chip is limited, it would be advantageous to use a full width array. Full width arrays require that several smaller sensor chips be mounted together on a rigid substrate to provide the long linear array of photosites required and probably the most desirable assembly technique for this is to butt the smaller sensor chips end-to-end with one another as shown in FIG. 1.

Figure 1:
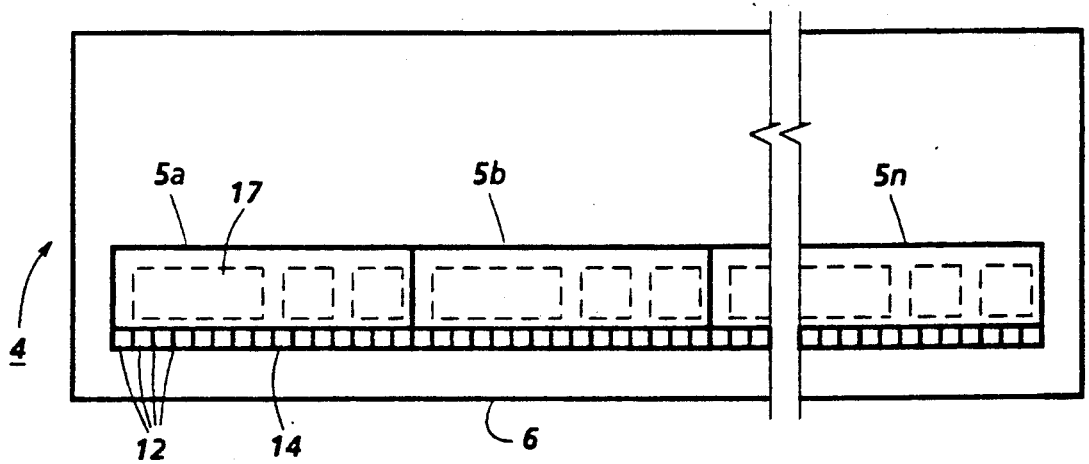
FIG. 1 is a top view illustrating a full width color array of the type fabricated by abutting a plurality of chips of the present invention together.

Referring to FIG. 1, there is shown a long or full width scanning array 4 composed of a plurality of smaller sensor chips or arrays 5 assembled together end-to-end (specific chips are identified by numerals 5a, 5b, ... 5n) on an elongated generally rectangular rigid substrate 6. Preferably, the overall length of array 4 is equal to or slightly greater than the width of the largest document to be scanned. An electrically conductive metallic covering or coating such as copper is provided on the side of substrate 6 to which the chips 5 are attached to provide the required ground connection and EMI immunity.

Chips 5, which may, for example, be Charge Coupled Devices (CCDs), are relatively thin silicon dies having a generally rectangular shape. A row 14 of photosites 12 parallels the longitudinal axis of the chips. While a single row 14 of photosites 12 is shown, plural photosite rows may be contemplated. Other active elements such as shift registers, gates, pixel clock, etc., (designated generally by the numeral 17 herein) are preferably formed integral with chips 5. Suitable external connectors (not shown) are provided for electrically coupling the chips 5 to related external circuitry.

Each photosite 12 consists of a photodiode whose shape is substantially rectangular, typically square. Inasmuch as the photodiodes are essentially rectangular, i.e. square, fabrication of full width long arrays by butting smaller chips end-to-end is facilitated.

In the case of color scanning however, the individual photosites are typically subdivided into three photodiodes, enabling the photosites to detect three different wavelength ranges. Normally, these comprise the three primary colors, i.e., blue, green, and red. While the invention is described in the context of the three primary colors, the invention is not limited to those colors or color combination. Other colors and color combinations such as cyan, magenta and yellow, etc. may instead be envisioned.

Figure 2:
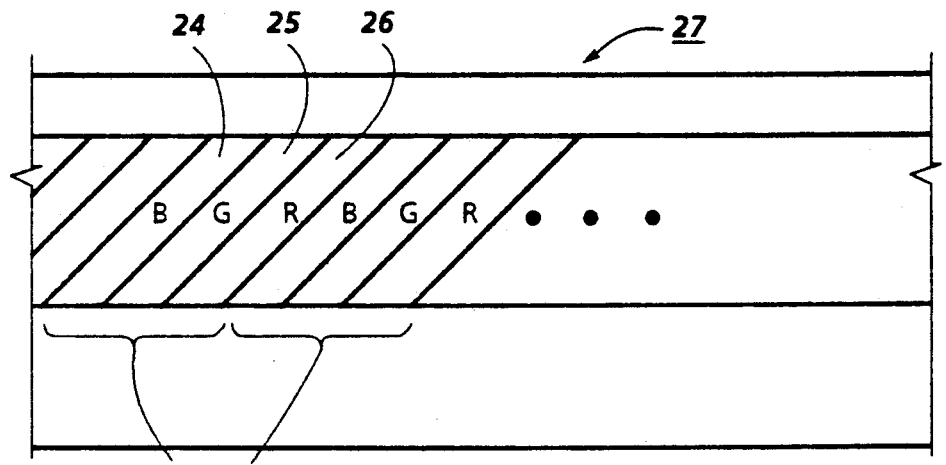
FIG. 2 depicts a prior art color chip photodiode geometry in which successive blue, green, and red photodiodes are set at an angle of approximately 45° to the array axis.

In the prior art arrangement shown in FIG. 2, the blue, green, and red color photodiodes 24, 25, 26 are arranged as long narrow elements disposed at an angle of 45° to the longitudinal axis of the array 27. As may be seen, this approach does not readily lend itself to butting the color chips 27 together in end-to-end relation without singular mechanical complications and/or significant image capture distortion at the assembly points.

However, certain shapes of the three photodiodes that make up a photosite can cause aliasing as well as asymmetric MTFs in the array fast scan (i.e., X) and the slow scan (i.e., Y) directions. As used herein, the array fast scan direction is the direction parallel to the longitudinal axis of the array while the slow scan direction is the direction in which relative scanning movement takes place between the array and the image being scanned.

The present invention enables fabrication of longer full width color arrays and facilitates the butting of smaller color chips end-to-end for this purpose while maintaining symmetric MTFs and reducing false edge colors. In the preferred embodiment shown in FIG. 3, the individual blue, green red photodiodes 32, 34, 36 that make up each color photosite 30 have a generally rectangular configuration or shape. The photodiodes 32, 34, 36 are disposed one above the other (i.e., in the Y direction) to make up a generally rectangular photosite window 31 and form the photosite 30. Preferably, blue and red photodiodes 32 and 36 are at the extremities of the window 31 while green photodiode 34 is in between although other orderings of the colors can be envisioned. Conductive strips 38 provide the requisite electrical conductor channels between the photodiodes 32, 34, 36 are related operating circuitry.

Figure 4:
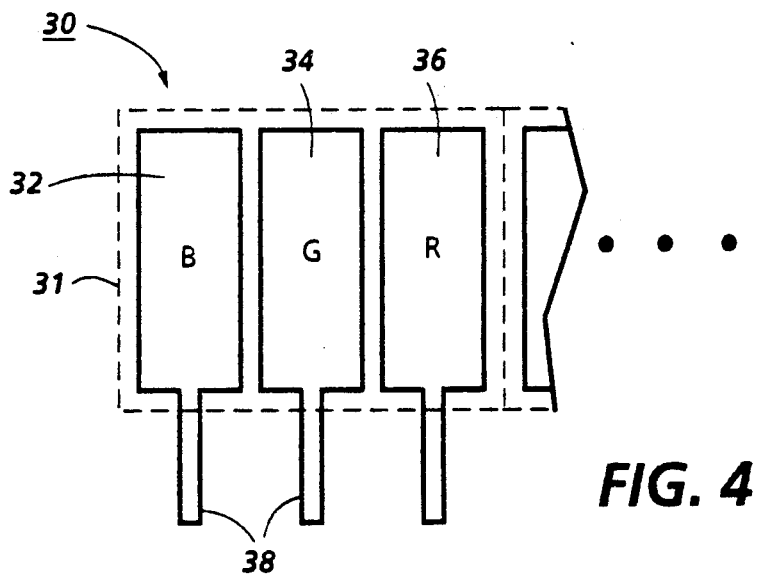
FIG. 4 depicts a second photodiode geometry according to the invention in which the rectangular photodiodes of FIG. 3 embodiment are disposed side by side along the X axis to form a rectangular photosite.

In the embodiment shown in FIG. 4 where like numerals refer to like parts, the blue, green, red photodiodes 32, 34, 36 are located in succession along the longitudinal axis of the chips 5 (i.e., in the X direction).

Figure 5:
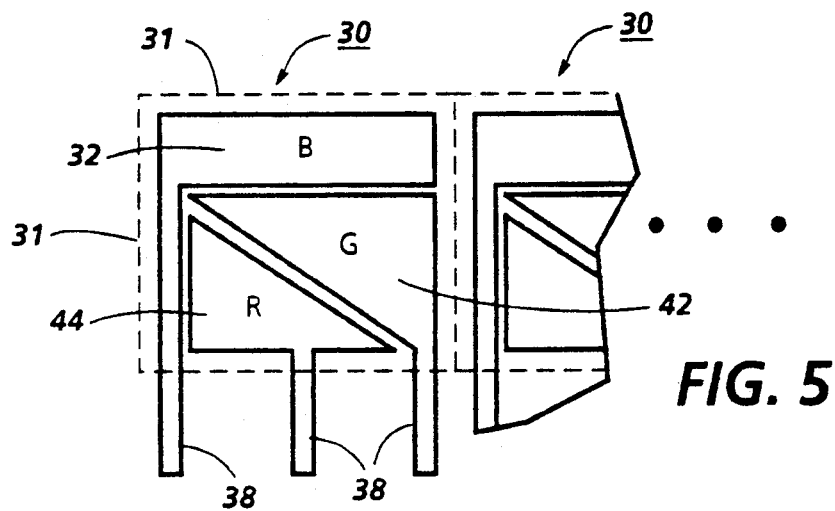
FIG. 5 depicts a third photodiode geometry according to the invention in which the green and red photodiodes have complementary triangular shapes for combination with one another and with the blue photodiode of the FIG. 3 embodiment to provide a rectangular photosite.

In the embodiment shown in FIG. 5 where like numerals refer to like parts, each photosite 30 is composed of a generally rectangular blue photodiode 32 with triangular shaped green and red photodiodes 42, 44 therebelow. Photodiodes 42, 44, which are disposed in spaced relation to one another along the hypotenuse, are substantially equal in size.

Figure 6:
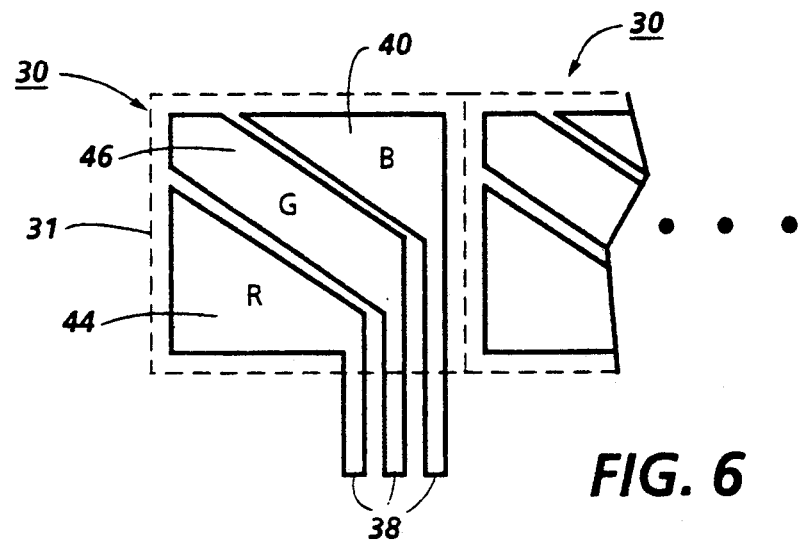
FIG. 6 depicts a third photodiode geometry according to the invention in which the blue and red photodiodes have complementary triangular shapes with a generally rectangular green photodiode disposed between to form a rectangular photosite.

In the embodiment shown in FIG. 6 where like numerals refer to like parts, the blue and red photodiodes 40, 44 are triangular in shape and of substantially equal size as in the FIG. 5 embodiment. Photodiodes 40, 44 are relatively widely separated along the hypotenuse and located in diametrically opposite upper and lower corners of the photosite window 31. Green photodiode 46, which is disposed in the space between photodiodes 40, 44, has a generally elongated rectangular shape inclined at an angle of approximately 45°.

Figure 3:
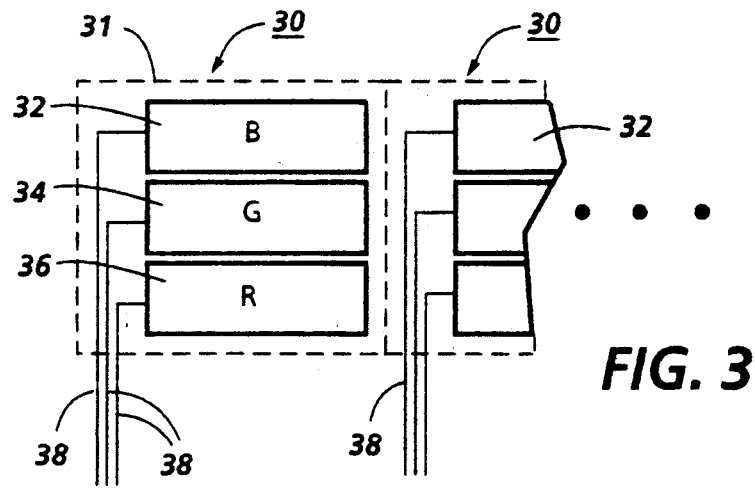
FIG. 3 depicts the preferred color chip photodiode geometry of the present invention in which the three color photodiodes shown as red, green, and blue in the Figure are rectangular in shape and disposed one above the other along the Y axis, the photodiodes cooperating to provide a rectangular photosite that facilitates using the chip for making full width arrays.
Figure 7:
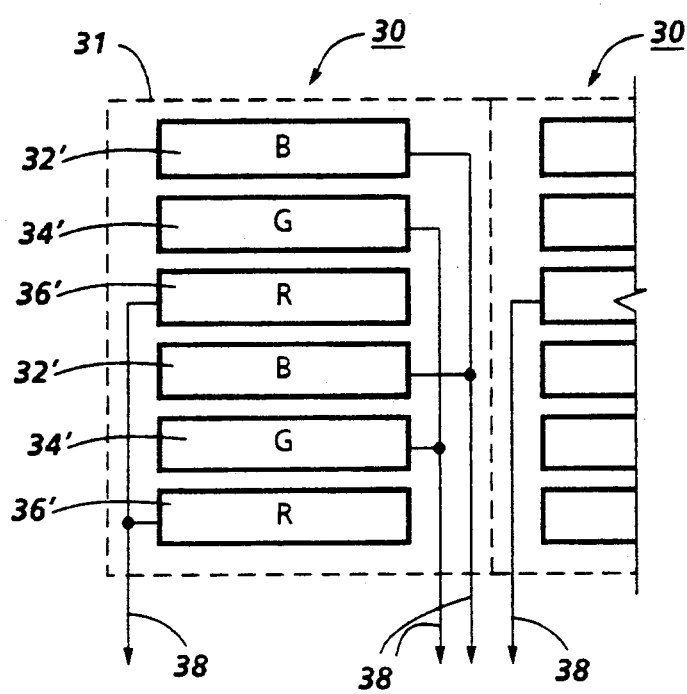
FIG. 7 depicts a fourth photodiode geometry according to the invention in which the rectangularly shaped blue, green and red photodiodes of the FIG. 3 embodiment are reduced to approximately one-half size, with duplicate sets of blue, green, and red photodiodes disposed one above the other along the Y axis to form a rectangular photosite.

In the embodiment shown in FIG. 7 where like numerals refer to like parts, the photosite window configuration is similar to that shown in FIG. 3. However, here the blue, green and red photodiodes 32', 34', 36' are approximately one half the size of the corresponding photodiodes 32, 34, 36 in the FIG. 3 embodiment. To fill the photosite window 31, the number of photodiodes 32', 34', 36' is doubled such that two sets of blue, green, and red photodiodes make up the photosite window.

Figure 8:
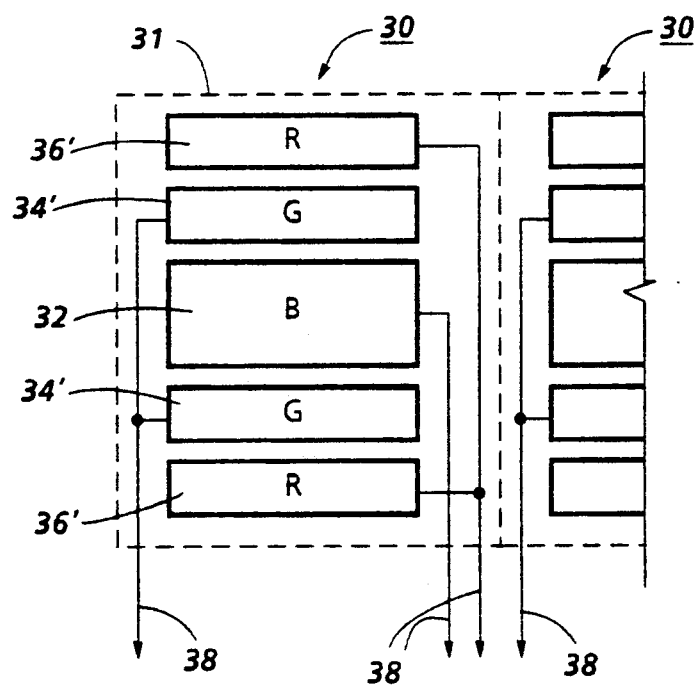
FIG. 8 depicts a fifth photodiode geometry according to the invention in which duplicate sets of red and green photodiodes of the FIG. 7 embodiment are used together with a full size rectangularly shaped blue photodiode therebetween, the photodiodes cooperating to form a rectangular photosite.

In the embodiment shown in FIG. 8 where like numerals refer to like parts, the photodiodes are generally rectangular in shape, with the green and red photodiodes 34', 36' approximately half size as in the FIG. 7 embodiment. The photosite window 31 has a pair of red and green photodiodes 36', 34' at the top and a second pair of green and red photodiodes 34', 36' at the bottom. A single full size blue photodiode 32 in the middle.

In the embodiment shown in FIG. 9, where like numerals refer to like parts, chips 5 have two parallel rows 14-1, 14-2 of substantially equally sized color photosite windows 60, 62. The number of photosensitive windows 60, 62 in rows 14-1, 14-2 are equal, with the windows aligned with one another in the slow scan direction. Each color photosite window 60 in row 14-1 has a single photodiode 65 while each color photosite window 62 in row 14-2 has two photodiodes 66, 67. As a result, photosite row 14-1 senses one color while photosite row 14-2 senses two colors. In the example shown, the photodiodes 65 in row 14-1 sense blue images, while the photodiodes 66, 67 in row 14-2 sense green and red images respectively.

Photodiodes 65 of color photosite windows 60 in row 14-1 have a substantially rectangular configuration or shape, with the photodiodes 65 making up substantially the entire photosite window. Conductive strips 61 provide the requisite electrical conductor channels between the photodiodes 65 and related operating circuitry.

Photodiodes 66, 67 of color photosite windows 62 similarly have a generally rectangular configuration or shape, but smaller in order to fit both photodiodes 66, 67 into a single photosite window 62. In the example shown, photodiodes 66, 67 are approximately one-half the size of photodiodes 65. However, the relative sizes of the photodiodes 66, 67 may be varied to adjust the ratio of the photosensitive areas to compensate for differences in spectral sensitivity. This may result in photodiode 66 being larger or smaller that photodiode 67, and vice versa.

Conductive strips 68, 69 provide the requisite electrical conductor channels between the photodiodes 66, 67 respectively and related operating circuitry. Photodiodes 66, 67 are disposed one above the other in the slow scan direction. However, photodiodes 66, 67 may instead be disposed side by side in the fast scan direction.

In the embodiment shown in FIG. 10, where like numerals refer to like parts, photodiodes 66, 67 that form the photosite windows 62 of row 14-2 are triangular in shape and of substantially equal size. Photodiodes 66, 67 are located in opposing upper and lower corners of the photosite windows 62.

It will be understood that the image signal output of rows 14-1, 14-2 will be out of synchronization with one another by one line during the scanning process since one row will always scan ahead or lag behind the other by one scan line. Any suitable means such as a one line delay buffer in the output of the lead scanning row, may be used to synchronize the image signal outputs of both rows with one another.

While photodiodes 65, 66, 67 have been described herein as sensing blue, green, and red images respectively, different color and color combinations may be envisioned. Additionally, the active areas of photodiodes 65, 66, 67 can be adjusted relative to each other to tailor the individual color sensitivity to the particular application and thereby reduce the need for gain correction. And, photodiode shape can be altered to change the spatial sensitivity of the individual photodiodes if required.

The photodiode geometry shown in FIGS. 9 and 10 also enable relatively large photosensitive areas to be maintained since the maximum number of photodiodes in the photosite windows are reduced. This enhances array sensitivity, and particularly that of the least sensitive element in the array. Since the photosensitive areas are larger, application of color separation filters is facilitated as well as the use of less sensitive chip material.

While the invention has been described with reference to the structure disclosed, it is not confined to the details set forth, but is intended to cover such modifications or changes as may come within the scope of the following claims.

We claim:

1. A color linear array especially adapted for butting with like arrays to form a full width color array, said array having a fast scan direction parallel to the linear axis of said array and a slow scan direction perpendicular to said linear axis, comprising in combination:
    a) a generally rectangular chip;
    b) first and second rows of discrete photosites on said chip extending from one end of said chip to the other, each individual one of said photosites in said first row consisting of first photodiodes for a first color while each individual one of said photosites in said second row consists of a combination of second and third photodiodes for second and third colors,
    the shape and physical size of individual ones of said first photodiodes in said first row of photosites being optimized to provide uniform detection of colored images of said first color while the individual ones of said second and third photodiodes that form each photosite of said second row are optimized to provide uniform detection of said second and third colors,
    said first photodiodes and said combination of said second and third photodiodes providing separate first and second rows respectively of generally rectangular photosite windows with square sides to enhance butting of the arrays together when forming said full width array without image loss or distortion at the point where said arrays abut, said first photodiodes substantially filling the photosite windows of said first row, said second and third photodiodes cooperating to substantially fill the photosite windows of said second row.

2. The color linear array according to claim 1 in which said first photodiodes providing said first row of photosites comprise blue photodiodes and said second and third photodiodes providing said second row of photosites comprise green and red photodiodes.

3. The color array according to claim 2 in which said blue photodiodes are in said first row and said green and red photodiodes are in said second row,
    said red photodiodes in said second row being disposed above said green photodiodes in said second row in the slow scan direction.

4. The color array according to claim 2 in which said red and green photodiodes in said second row have complementary triangular shapes and size, said triangular photodiodes being spaced apart at diametrically opposed corners of said photosite window in said second row.

5. The color array according to claim 1 in which said first photodiodes providing said first row of photosites and said second and third photodiodes providing said second row of photosites are rectangular in shape,
    each of said second and third photodiodes in said second row being substantially equal in size to one another and arranged in side by side relation to one another along said fast scan direction.

6. The color array according to claim 5 in which the longitudinal axis of said first photodiodes providing said first row of photosites and the longitudinal axes of said second and third photodiodes providing said second row of photosites are parallel to the slow scan direction.

7. The color array according to claim 5 in which the longitudinal axis of said first photodiodes providing said first row of photosites and the longitudinal axes of said second and third photodiodes providing said second row of photosites are parallel to the fast scan direction.

8. The color array according to claim 1 in which said first photodiodes and said second and third photodiodes are rectangular in shape, each of said second and third photodiodes in said second row being substantially equal in size to one another and arranged one above the other in said slow scan direction.

9. The color array according to claim 1 in which said first, second, and third photodiodes in both said first and second rows at each photosite position in said rows are disposed one above the other in the slow scan direction.

10. The color array according to claim 1 in which said second and third photodiodes in said second row have complementary triangular shapes while said first photodiodes in said first row have a rectangular shape; each of said triangular second and third photodiodes being substantially equal in size to one another.

11. The color array according to claim 10 in which said triangular photodiodes comprise green and red photodiodes while said rectangular photodiode comprises a blue photodiode.

* * * * *